(12) United States Patent
Fuchs et al.

(10) Patent No.: US 8,142,114 B2
(45) Date of Patent: Mar. 27, 2012

(54) STATIONARY POWER DRILL

(75) Inventors: Rudolf Fuchs, Neuhausen (DE); Ulrich Mueller-Boysen, Esslingen (DE); Siegfried Keusch, Deizisau (DE); Markus Meier, Deizisau (DE); Sabine Rau, Denkendorf (DE)

(73) Assignee: Robert Bosch GmbH, Stuttgart (DE)

( * ) Notice: Subject to any disclaimer, the term of this patent is extended or adjusted under 35 U.S.C. 154(b) by 1096 days.

(21) Appl. No.: 11/957,659

(22) Filed: Dec. 17, 2007

(65) Prior Publication Data

US 2008/0166193 A1 Jul. 10, 2008

(30) Foreign Application Priority Data

Jan. 10, 2007 (DE) .......................... 10 2007 001 559

(51) Int. Cl.
*B23B 47/18* (2006.01)

(52) U.S. Cl. .................... 408/135; 408/241 S; 408/136; 408/16

(58) Field of Classification Search ............... 408/241 S, 408/110, 111, 112, 135, 136
See application file for complete search history.

(56) References Cited

U.S. PATENT DOCUMENTS

| 3,008,155 A | * | 11/1961 | Tsuda | 408/9 |
| 3,257,909 A | * | 6/1966 | Henkel | 409/206 |
| 3,822,961 A | * | 7/1974 | Lay | 408/236 |
| 6,002,250 A | * | 12/1999 | Masreliez et al. | 324/207.16 |
| 6,516,842 B1 | * | 2/2003 | Chang | 144/74 |
| 2006/0157154 A1 | * | 7/2006 | Schwaiger et al. | 144/75 |

* cited by examiner

*Primary Examiner* — Daniel Howell
*Assistant Examiner* — Paul M Janeski
(74) *Attorney, Agent, or Firm* — Ronald E. Greigg

(57) ABSTRACT

A stationary power drill has a drill unit disposed in a tool housing is connected to a base vertically adjustably via a guide column and is vertically adjustable along the guide column by means of a drive unit. The drive unit includes a rotating drive shaft, and a compensation spring element engaging the drive shaft and braced on the other end on the tool housing.

10 Claims, 5 Drawing Sheets

STATIONARY POWER DRILL

REFERENCE TO FOREIGN PATENT APPLICATION

This application is based on German Patent Application No. 10 2007 001 559.5 filed 10 Jan. 2007, upon which priority is claimed.

BACKGROUND OF THE INVENTION

1. Field of the Invention

The invention relates to an improved stationary power drill.

2. Description of the Prior Art

In German Utility Model DE 20 2005 005 768 U1, a stationary power drill is described which in a tool housing has a drill head, driven by an electric motor; the tool housing is held vertically adjustably on a guide column and is braced on a base. An electric motor is disposed in the base and drives a hollow shaft, rotatably supported in the column, and moves a spindle, disposed fixedly in the tool housing, up or down depending on the direction of rotation of the drive motor. The feeding motion of the drill unit received in the tool housing is realized by way of the vertical adjusting motion of the entire tool housing along the guide column. The feeding motion in the direction of the workpiece and the raising in the opposite direction are done via the actuation of the electric drive motor. To maintain a specific position of the tool housing, a locking device with which the tool housing is locked on the guide column must expediently be provided; otherwise, there is the risk that the tool housing by its own weight will overcome the resistance of the stopped electric motor and creep downward along the guide column.

OBJECT AND SUMMARY OF THE INVENTION

The object of the invention is, by simple structural provisions, to make a stationary power drill easier to operate.

The stationary power drill of the invention has a drill unit, disposed in a tool housing; the tool housing is connected vertically adjustably to a base via a guide column. Along the guide column, with the aid of a drive unit, the tool housing is settable in height. The drive unit includes a rotating drive shaft, which is engaged by a compensation spring element that is braced on the other end on the tool housing, or on a component connected to the tool housing. With the aid of the compensation spring element, a compensation of mass is achieved, so that the tool housing, including all the components disposed in it, is located at least approximately in a static equilibrium, and the vertical lowering and raising motion of the tool housing can be done with only minimal expenditure of adjusting effort. In a practical way, this static equilibrium extends over the entire vertical working range of the power drill, or at least over the great majority of the working range. Because of the state of equilibrium, only dynamic adjusting forces and the initial friction for the vertical adjustment of the tool housing have to be overcome. Besides the fact that the driving forces are minimized, this embodiment has the further advantage that the tool housing always maintains its current position even if the drill unit is not in the drilling mode at the time. It is therefore not necessary to lock the tool housing relative to the guide column, in order to prevent the tool housing from being lowered unintentionally by its own weight.

Since the compensation spring element is located on or inside the tool housing of the power drill, the force bracing is effected relative to the tool housing, so that no additional components between the tool housing and the guide column, or the base, are required for the force bracing. Moreover, the force bracing automatically occurs without additional intervention by a tool user.

In a practical refinement, the compensation spring element is embodied as a torsion spring, which in particular is held on an axle that is fixedly anchored in the tool housing. On its other end, the compensation spring element is connected to the drive shaft, or to a component coupled with the drive shaft, so that the transmission of spring force is effected between the axle structurally connected to the housing and the rotatable drive shaft. In order to attain an at least approximately uniform force bracing over the adjustment course with the aid of the compensation spring element, this element expediently has a spring characteristic with a relatively shallow course, so that even upon an elongation of the spring element, the spring force rises only to a relatively slight extent. If an increase in spring force from the elongation of the spring element is unavoidable, then the outset state with minimal spring force action is located in the uppermost position of the tool housing, so that upon an adjustment downward, the compensatory spring force increases as well. Over the entire adjustment course, the increase in the compensatory spring force, however, expediently remains within the resistance that, upon a deflection of the tool housing from a stationary position, has to be overcome by overcoming the friction or other resistances in the drive, so that an unwanted reverse motion of the tool housing tripped by the increasing spring force of the compensation spring element is precluded.

The drive unit by way of which the tool housing is adjusted vertically along the guide column is expediently embodied as a manually actuatable drive. For that prose, a handwheel on the tool housing is provided in particular, by way of which a pinion that meshes with the guide column and is rotatably supported in the tool housing is actuated. The pinion shaft is advantageously identical here with the drive shaft that is engaged by the compensation spring element.

On the other end, the compensation spring element, embodied in particular as a torsion spring, is seated on an axle fixedly anchored in the tool housing; fundamentally, the compensation spring element is held rotatably on the axle but is seated on the axle with frictional engagement. This embodiment has the advantage that with increasing elongation of the spring element and the attendant increase in the spring force, the frictional moment about the axle about which the spring element is wound is finally exceeded, so that at this point the spring element begins to rotate about the axle until a new position of equilibrium is reached. This incremental followup of the spring element has the advantage that in practically every vertical position of the tool housing, a state of equilibrium can be established. Thus an extensive degree of independence from the course of the spring characteristic is achieved.

The feeding motion of the drill unit, in a further preferred embodiment, is effected solely by way of the adjusting motion of the tool housing relative to the guide column. A separate feed unit that pertains only to the drill unit inside the tool housing can be dispensed with in this embodiment. This simplifies the structural design quite considerably. Since the entire drilling apparatus is moved vertically along the guide column, the maximum height of the column can also be utilized for the feeding motion. This makes it possible in a single motion sequence to produce drilled holes of great depth. An embodiment with a separately adjustable advancement of the drill unit relative to the tool housing is equally possible.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
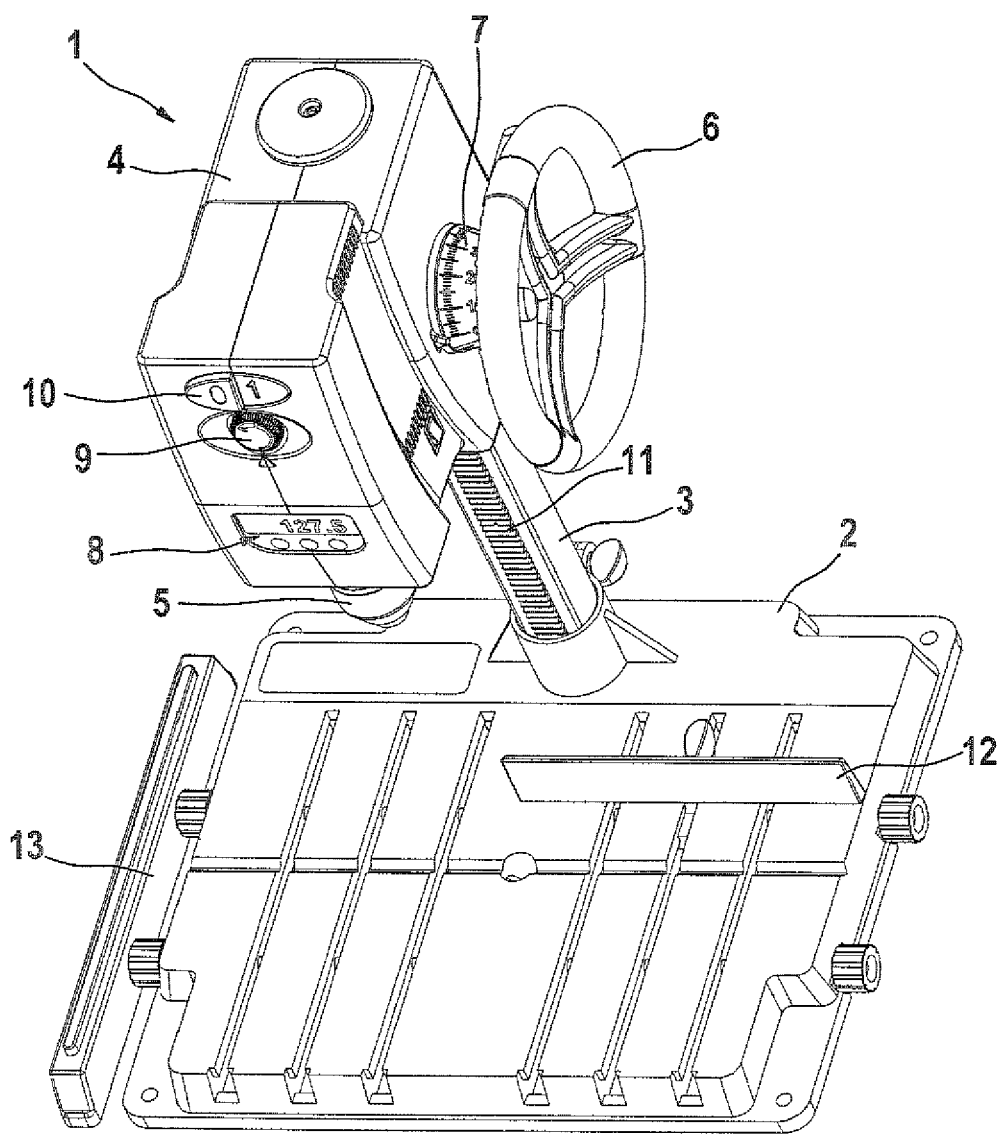
FIG. 1 is a perspective view of a stationary power drill, comprising a base embodied as a base plate, a vertical guide column, and a tool housing, with a drill unit that is manually adjustable along the guide column.
Figure 2:
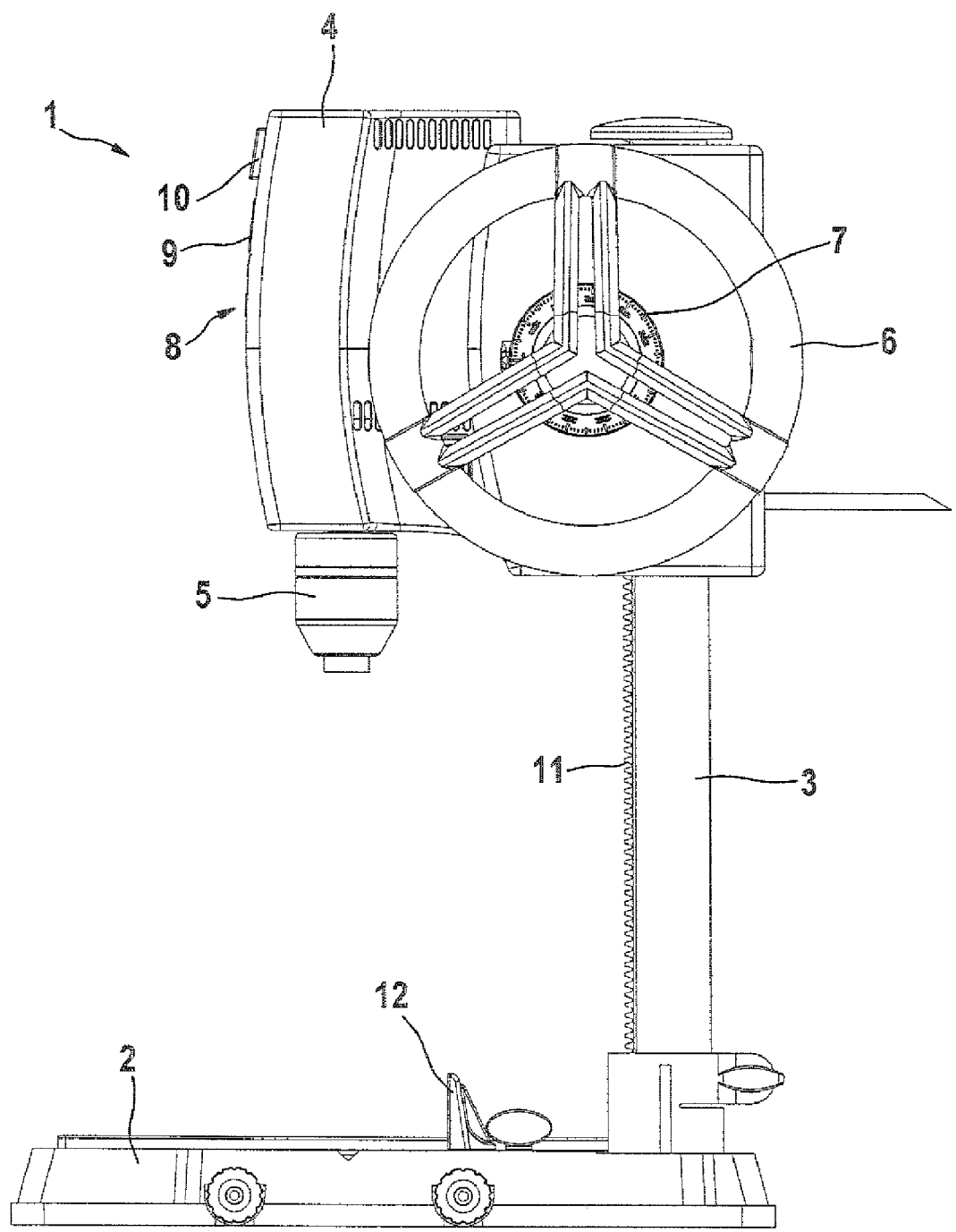
FIG. 2 is a side view of the stationary power drill shown in FIG. 1.
Figure 3:
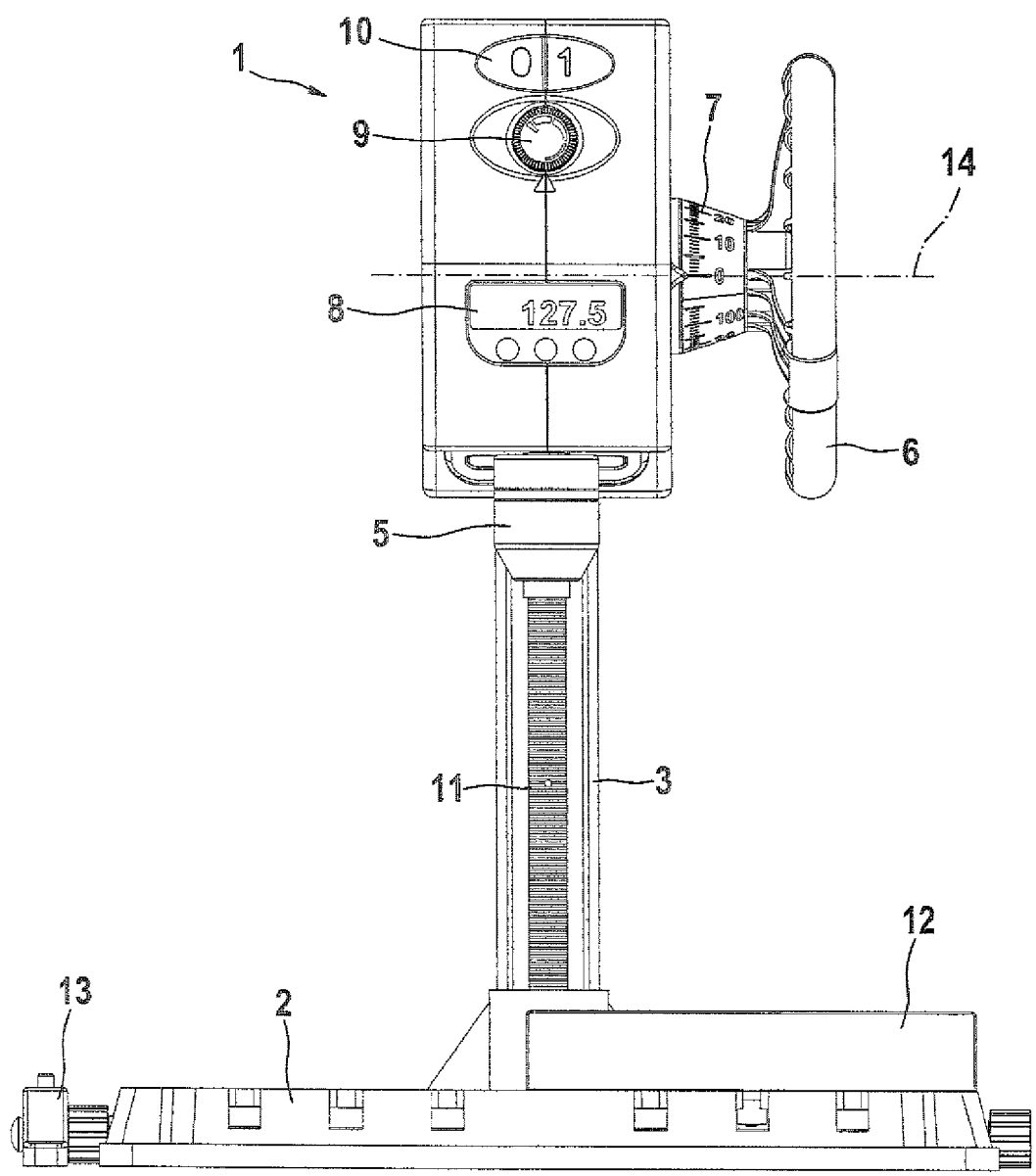
FIG. 3 shows the power drill from the front.

The stationary power drill 1 shown in FIGS. 1 through 3 includes a base 2, embodied as a base plate, on which a vertical guide column 3 is disposed that is the carrier of a tool housing 4 with a drill unit 5 received in the housing. The tool housing 4 is embodied as manually adjustable vertically and has a handwheel 6 that is to be actuated by the drill operator and upon the rotation of which the tool housing 4 is adjustable vertically along the guide column 3. On the handwheel 6, there is a ring scale 7 for reading out the currently set height of the tool housing.

In the front region of the tool housing 4, there is a display panel 8, embodied for instance as an LCD and on which various parameters can be displayed, such as the rpm of the drill unit 5 and the absolute position in terms of height of the tool housing. The rpm of the drill unit is meant to be set via an rpm adjuster 9 also disposed in the front region of the tool housing 4. An on/off actuation switch 10 for the drill unit is also disposed in the front region.

The guide column 3 is provided with a set of teeth 11, with which a pinion rotatably supported in the tool housing 4 meshes; the pinion is meant to be actuated by the handwheel 6. The vertical up-and-down motion of the tool housing 4 is attained by rotating the handwheel 6 in the appropriate direction of rotation; the pinion, which is actuated by the handwheel 6 and meshes with the teeth 11 on the guide column, moves the entire tool housing, including all the components received in it, up and down. The axis of rotation of the handwheel 6 is identified by reference numeral 14.

The drill unit 5 is driven by an electric motor; the electric drive motor of the drill unit is disposed in the tool housing 4.

The base 2 of the power drill is embodied as a base plate, which serves to receive the workpiece to be machined. Stops 12 and 13, which form limits for the workpiece, are disposed on the base 2. The stops 12 and 13 are expediently embodied adjustably in or on the base plate 2; optionally, a spring element that acts on one or both stops and urges the stops in one direction by force can also be considered.

Figure 4:
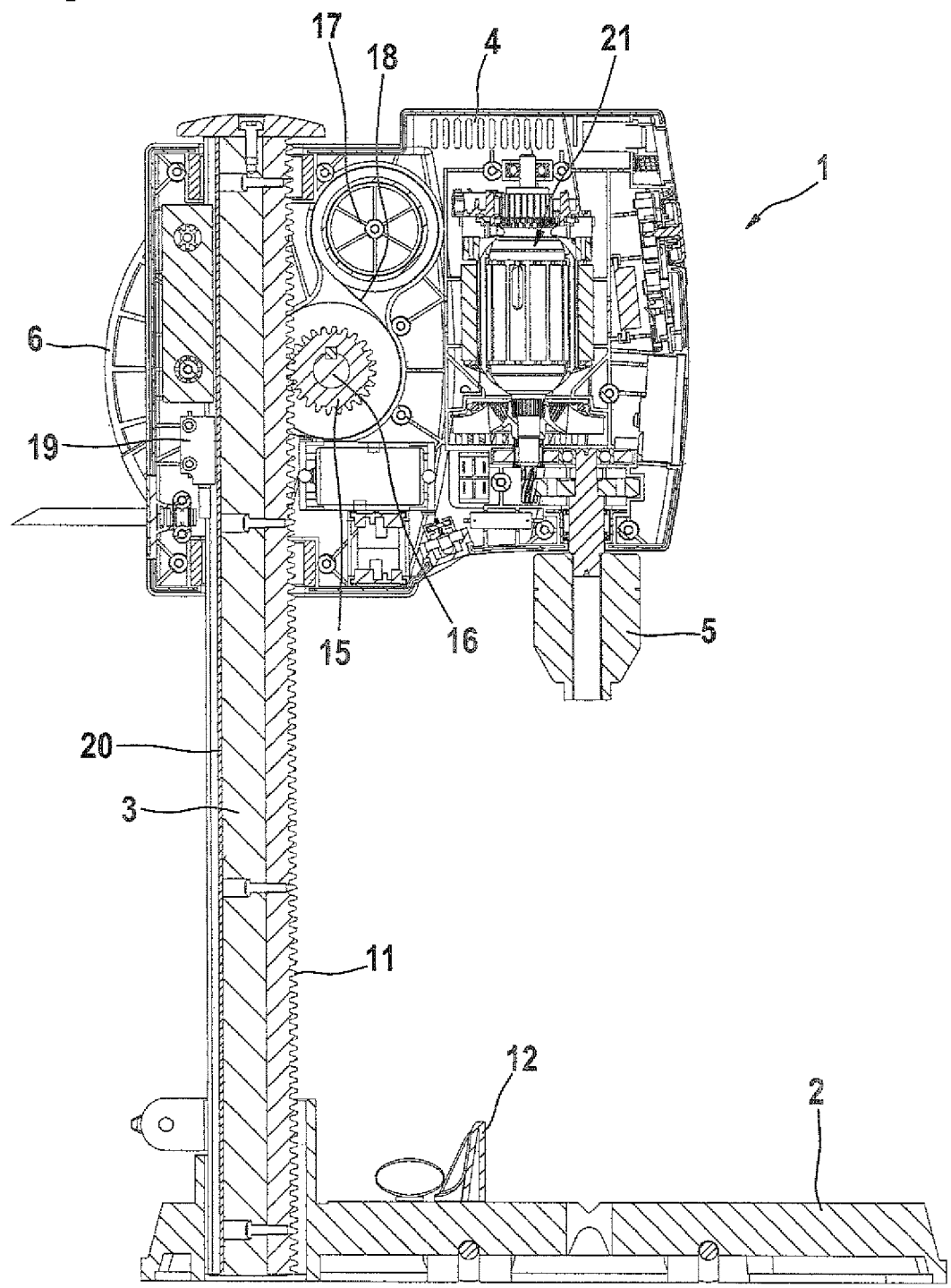
FIG. 4 shows the power drill in section.

As can be seen from the sectional view in FIG. 4, a pinion 15 with a pinion shaft 16 is rotatably supported in the tool housing 4; the pinion 15 meshes with the teeth 11 on the guide column 3. The pinion shaft 16 at the same time forms the drive shaft for the tool housing 4 and is connected to the handwheel 6 in a manner fixed against relative rotation, so that upon a manually generated rotation of the handwheel 6 via the pinion shaft 16, the pinion 15 rotates; the rotary motion resulting from the intervention into the teeth 11 on the guide column 3 causes a vertical adjusting motion upward or downward.

Offset from and parallel to the drive shaft 16, an axle or support shaft 17 is disposed fixedly in the tool housing 4 and is the carrier of a compensation spring element 18. In the exemplary embodiment, this compensation spring element 18 is embodied as a torsion spring, which is wound around the shaft 17 and one end of which fixedly engages the circumference of a component, such as a portion of the drive shaft or pinion shaft 16, that is connected to the pinion 15 in a manner fixed against relative rotation. Upon a rotary motion of the pinion 15, tripped by an actuation of the handwheel 6, the torsion spring 18 is wound up around the drive shaft 16 or unwound from it, depending on the direction of rotation. In this way, the torsion spring 18 permanently exerts a holding force, oriented counter to the downward motion, on the drive shaft 16, which compensates for the mass forces that result from the weight of the tool housing, including all the components contained in it. In this way, the tool housing is always in a state of static equilibrium.

The torsion spring 18 is expediently disposed rotatably, but with frictional engagement, on the shaft 17. The frictional engagement keeps the torsion spring in an unchanged position on the shaft 17 until such time as the forces transmitted via the torsion spring are less than the frictional engagement. As soon as the spring forces exceed the frictional engagement, the torsion spring on the shaft 17 will assume a new rotational position, in which the current forces in the spring element are reduced. This has the advantage that the spring forces in the torsion spring, which increase with increasing elongation, are reduced again to a lesser amount, so that the spring forces always vary within a defined spring force range with spring force limitation.

To display the current vertical height or vertical adjusting motion, a magnetic measuring device is provided, comprising a magnetic sensor 19 in the tool housing 4 and a magnetic strip 20 that extends in the vertical direction along the longitudinal axis of the guide column 3. The magnetic measuring device is embodied as a magnetoresistive device.

In FIG. 4, the electric drive motor 21 for driving the drill unit 5 can also be seen. The drill head of the drill unit is expediently embodied replaceably.

Figure 5:
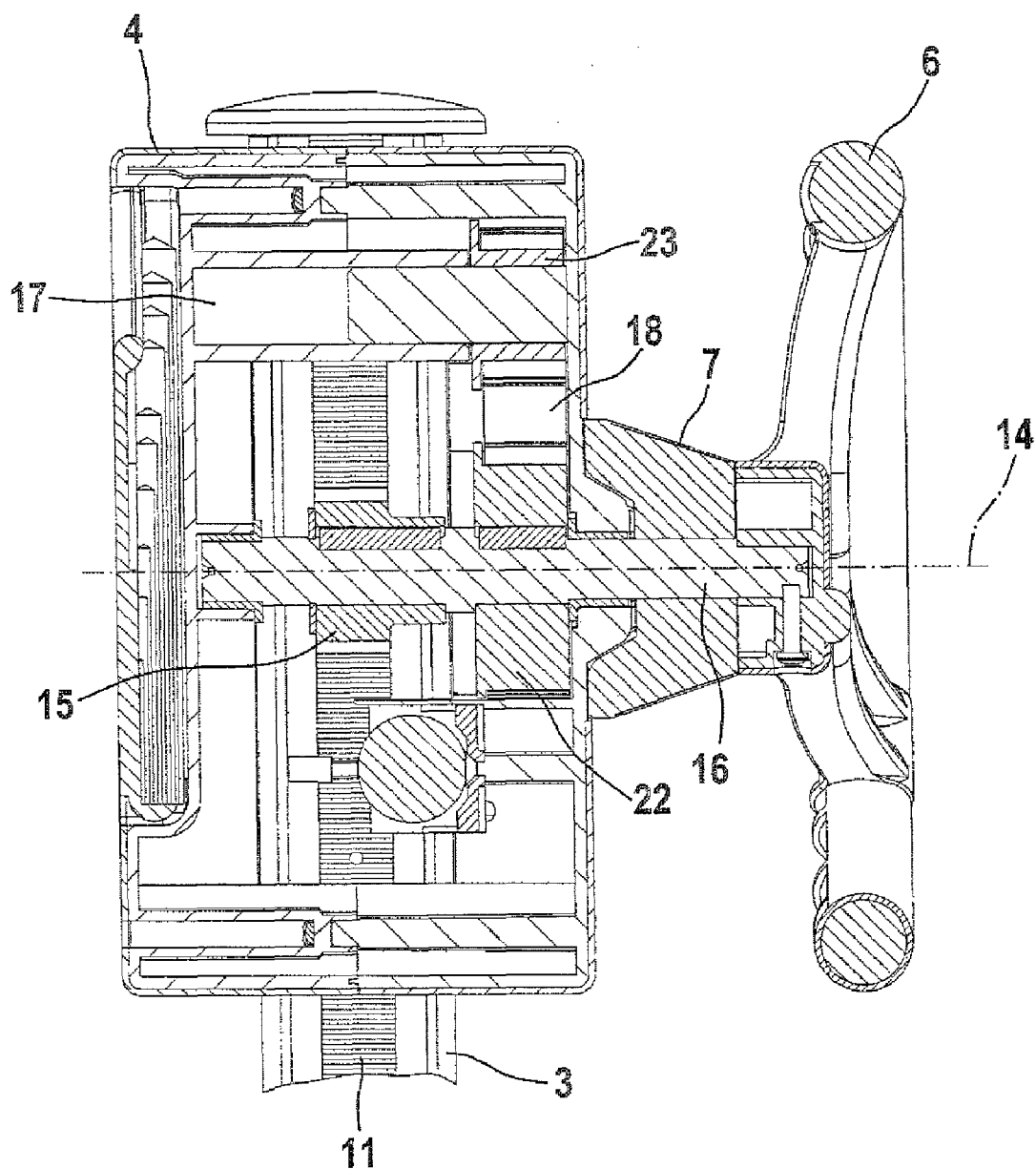
FIG. 5 is an enlarged sectional view of the hand-driven tool housing of the power drill.

In FIG. 5, the tool housing 4 is shown in a different sectional view. The compensation spring element 18 embodied as a torsion spring is wound with frictional engagement around a cylinder 23 that is fixedly connected to the shaft 17, the latter being received in the tool housing 4 in a manner fixed against relative rotation. On the other end, the torsion spring 18 is fixedly coupled with a cylinder 22 that is seated on the drive shaft 16 in a manner fixed against relative rotation and is capable of rotating jointly with it. Upon a downward motion of the tool housing 4 along the guide column 3, the torsion spring 18 becomes elongated, while upon an upward motion, it correspondingly contracts again. Since the torsion spring 18 is connected only by frictional engagement around the cylinder 23, the torsion spring can rotate around the cylinder 23 as soon as the force in the torsion spring is greater than the frictional engagement.

The handwheel 6 can advantageously be slipped onto the drive shaft 16 from either end, to make tool operation easier.

In a further advantageous feature, a universal motor may be used as the drive; with it, high rotary speeds can be achieved, which also allows the use of milling tools. To compensate for vibration from imbalance, elastic damper elements may be provided, which are disposed in particular in or on the drive motor, the housing, and/or the gear or the spindle part and damp vibration. The transmission between the drive motor and the shaft of the drill unit is expediently done via a single- or multi-stage gear. The guide column is advantageously made in two parts and comprises an extruded aluminum profile with a screwed-on rack over the entire adjustment range. For supporting the guide column, bushes may be inserted into the tool housing; to prevent torsion, a column guide which engages the groove in the guide column with play may also be provided in the tool housing.

In the exemplary embodiment, the vertical adjusting motion of the tool housing is embodied as a hand-driven motion. However, it may also be expedient to perform the adjusting motion by means of an electric motor.

The foregoing relates to preferred exemplary embodiments of the invention, it being understood that other variants and embodiments thereof are possible within the spirit and scope of the invention, the latter being defined by the appended claims.

We claim:

1. A stationary power drill comprising a drill unit disposed in a tool housing, the tool housing being vertically adjustably connected to a base via a guide column and being vertically adjustable by means of a drive unit along the guide column, the drive unit including a rotating drive shaft, and a compensation spring element, which compensation spring element is a torsion spring having one end engaging the drive shaft and its other end wound with frictional engagement around a cylinder that is fixedly connected to a shaft which is received within the tool housing in a manner fixed against relative rotation.

2. The power drill as defined by claim 1, wherein the guide column has a set of teeth, and wherein the drive unit comprises a pinion supported rotatably in the tool housing and meshing with the teeth on the guide column.

3. The power drill as defined by claim 1, wherein the pinion is mounted on a pinion shaft which forms the drive shaft.

4. The power drill as defined by claim 1, wherein the drive unit is manually actuatable.

5. The power drill as defined by claim 4, further comprising a handwheel connected to the drive shaft.

6. The power drill as defined by claim 1, wherein a feeding motion of the drill unit is effected solely via an adjusting motion of the tool housing relative to the guide column.

7. The power drill as defined by claim 1, further comprising a measuring and display device for detecting and displaying an adjusting motion of the tool housing relative to the guide column.

8. The power drill as defined by claim 7, wherein the measuring and display device comprises a magnetic measuring device which includes a magnetic sensor in the tool housing and a magnetic strip on the guide column.

9. The power drill as defined by claim 1, wherein the base of the power drill is embodied as a base plate for receiving a workpiece to be machined.

10. The power drill as defined by claim 9, further comprising an adjustable stop disposed in the base plate for clamping the workpiece in place.

* * * * *